United States Patent
Roe

(10) Patent No.: US 11,905,457 B2
(45) Date of Patent: Feb. 20, 2024

(54) CHEMICAL COMPOSITIONS AND METHODS OF USING SAME FOR REMEDIATING SULFUR-CONTAINING COMPOSITIONS AND OTHER CONTAMINANTS ENCOUNTERED IN DRILLING WELLS

(71) Applicant: GAPS Technology, LLC, Slidell, LA (US)

(72) Inventor: Cliffton Lee Roe, Harrison Township, MI (US)

(73) Assignee: GAPS Technology, LLC, Slidell, LA (US)

( * ) Notice: Subject to any disclaimer, the term of this patent is extended or adjusted under 35 U.S.C. 154(b) by 0 days.

(21) Appl. No.: 17/901,454

(22) Filed: Sep. 1, 2022

(65) Prior Publication Data
US 2023/0072992 A1    Mar. 9, 2023

Related U.S. Application Data

(60) Provisional application No. 63/239,576, filed on Sep. 1, 2021.

(51) Int. Cl.
| | | |
|---|---|---|
| *E21B 21/06* | (2006.01) | |
| *C09K 8/03* | (2006.01) | |
| *C09K 8/035* | (2006.01) | |
| *C09K 8/54* | (2006.01) | |

(52) U.S. Cl.
CPC ............. *C09K 8/032* (2013.01); *C09K 8/035* (2013.01); *C09K 8/54* (2013.01); *E21B 21/062* (2013.01); *C09K 2208/20* (2013.01)

(58) Field of Classification Search
CPC .......... C09K 8/032; C09K 8/035; C09K 8/54; C09K 2208/20; E21B 21/067
See application file for complete search history.

(56) References Cited

U.S. PATENT DOCUMENTS

| | | | | |
|---|---|---|---|---|
| 5,337,824 | A * | 8/1994 | Cowan | C09K 8/46 507/140 |
| 5,411,086 | A * | 5/1995 | Burcham | E21B 43/30 166/308.1 |
| 6,365,053 | B1 * | 4/2002 | Sunde | E21B 21/06 210/757 |
| 10,913,911 | B1 | 2/2021 | Roe | |
| 2018/0072936 | A1 * | 3/2018 | Sehsah | E21B 41/02 |
| 2019/0322951 | A1 * | 10/2019 | Roe | C02F 1/50 |
| 2021/0230487 | A1 | 7/2021 | Roe et al. | |

FOREIGN PATENT DOCUMENTS

| | | |
|---|---|---|
| WO | 2019/036731 A2 | 2/2019 |
| WO | 2019/209379 A1 | 10/2019 |

\* cited by examiner

*Primary Examiner* — Silvana C Runyan
(74) *Attorney, Agent, or Firm* — Carrier, Shende & Associated P.C.; Joseph P. Carrier; Fulchand P. Shende

(57) ABSTRACT

A modified drilling mud is provided which addresses a problem of $H_2S$ and other gaseous contaminants in the environment around a well drilling platform or other well drilling operation by remediating or eliminating the gaseous contaminants in the fluids being extracted from the well. The drilling mud is modified by addition of a liquid treatment composition including water and collectively 35-55 weight percent of one or more hydroxide compounds, wherein a ratio of the liquid treatment composition to the drilling mud in the modified drilling mud is in a range of 10 gallons of the liquid treatment composition per 42,000 gallons of drilling mud to 100 gallons of the liquid treatment composition per 42,000 gallons of drilling mud.

9 Claims, No Drawings

CHEMICAL COMPOSITIONS AND METHODS OF USING SAME FOR REMEDIATING SULFUR-CONTAINING COMPOSITIONS AND OTHER CONTAMINANTS ENCOUNTERED IN DRILLING WELLS

CROSS-REFERENCE TO RELATED APPLICATIONS

This application claims priority to U.S. Provisional Application Ser. No. 63/239,576, filed Sep. 1, 2021. The entire subject matter of this priority application is incorporated by reference herein.

BACKGROUND OF THE INVENTION

1. Field of the Invention

The present disclosure relates to novel, cost effective treatment compositions and treatment methods for remediating various toxic and/or noxious contaminants, including $H_2S$, $NH_3$ etc., in fluids encountered in drilling wells and drilling operations at the wells, including crude oil, natural gas/methane ($CH_4$), and so-called "produced water" that is extracted together with crude oil and natural gas. More particularly, the present disclosure relates to such treatment compositions and methods in which the treatment compositions are used in preparing drilling mud which may be pumped down hole of the wells, e.g., between a drill pipe and a drilling platform stem, for the purpose of remediating the contaminants, especially $H_2S$, $NH_3$ and other toxic and/or noxious contaminants, in the fluids being extracted from the earth through the drilling wells down to very low, safe levels, and to thereby prevent such contaminants from creating a hazardous atmosphere around the drilling platform, in an efficient and economical manner.

2. Background

Sulfur-containing compounds including hydrogen sulfide ($H_2S$) have long been recognized as undesirable contaminants in various fluids including hydrocarbon or petroleum based fluids such as crude oil, natural gas and contaminated aqueous solutions extracted from the earth along with crude oil and natural gas, etc. Herein "hydrocarbon based liquid" is used to indicated any hydrocarbon based liquid, including petroleum based liquids. Examples of hydrocarbon based liquids which may be treated with the treatment solutions and treatment methods of the present invention include those containing molecules of $CH_9$ to $CH_{32}$. $H_2S$ is a particularly undesirable contaminant because it is highly toxic, corrosive, etc. and generally petroleum based liquids such as crude oil should contain less than five ppm $H_2S$ in order to be acceptable for refining, other processing or use. While the amount of $H_2S$ in hydrocarbon based liquids can range from a few ppm to more than 100,000 ppm, crude oil from the ground typically contains ≤40,000 ppm $H_2S$, most often ≤2000 ppm $H_2S$, and will generally be somewhat acidic with a pH about 5 to 6. The $H_2S$ may be present in several forms, including $H_2S$ dissolved in a liquid, $H_2S$ as mercaptan sulfur and $H_2S$ content in vapor or gaseous form, but the majority is typically present as $H_2S$ content in vapor or gaseous form, particularly at ambient pressure of about 1 atmosphere, and the release of $H_2S$ in vapor or gaseous form is particularly toxic and dangerous to humans and other animals.

$H_2S$ gas has much greater solubility in hydrocarbon based liquids than in water, and at the high pressures at which crude oil exists underground, e.g., 1500 psi to 3000 psi at a well depth of 10,000 feet, it is possible for the crude oil to have thousands and tens of thousands of ppm $H_2S$ therein. Ammonia ($NH_3$) is another toxic contaminant that is commonly dissolved or otherwise contained in the crude oil extracted from the earth. The $H_2S$ and other toxic contaminants including $NH_3$ are dissolved and fully contained in crude oil and other associated liquids when underground at very high pressures, but some of such toxic contaminants are released from the contaminated liquids in gaseous form and combine with natural gas/methane ($CH_4$) and form a "sour gas" as the liquids rise to the earth's surface through a well and the pressure of the fluids is greatly reduced, consistent with Henry's Law, Such sour gas is mostly contained within the piping of the wells, but it is common for small amounts of the sour gas to escape and be released into the ambient atmosphere around well at the earth's surface, particularly when the well is being drilled. Hence, there is need to remediate $NH_3$ and other toxic and/or noxious contaminants in the sour gas encountered in drilling wells, and preferably prevent these toxic and/or noxious contaminants from being released into the atmosphere around a well drilling operation because this may create a very hazardous condition for anyone who is exposed to these gaseous contaminants. The amount of soluble and gaseous $H_2S$ which can be in aqueous solutions is less than the amount which may be in hydrocarbon based liquids, but it still can be present in hundreds and thousands of ppm, and contaminated aqueous solutions will typically contains ≤1000 ppm $H_2S$. Generally, $H_2S$ is an acidic compound. Crude oil as extracted from the ground and containing a typical amount of $H_2S$, e.g. ≤2000 ppm, which is mostly in the form gas dissolved in the crude oil, has a moderately acidic pH of about 5-5.5. Gaseous $H_2S$ does not exist in solution above a pH of about 7. Similarly, $NH_3$ is converted to $NH_4$, at a pH of 7 or higher.

There are known treatment compositions and treatment methods for remediating $H_2S$, $NH_3$ and other contaminants in fluids such as crude oil, natural gas and the aqueous solutions extracted from the earth along with these fluids, including treatment compositions and treatment methods previously proposed by the present inventor. These known treatment compositions and treatment methods generally involve treating the fluids after they are extracted from the wells. However, the $H_2S$ and other contaminants are also known to create toxic conditions in the environment around a well drilling platform because these contaminants may be released in gaseous form from the well as a bore of the well is being drilled and as the natural gas is being extracted from the well. For example, some of the $H_2S$ in the fluids being extracted from the well may escape from the well and be released into the atmosphere from the well's drill pipe and/or drilling platform stem, and the escaped $H_2S$ may accumulate in the atmosphere around the drilling platform potentially creating a very hazardous and dangerous condition for any people exposed to the atmosphere, including workers on the drilling platform. Correspondingly, levels of $H_2S$, $NH_3$ and other toxic gasses around drilling platforms are monitored and if the levels exceed predetermined, safe limits, e.g., 5 ppm, the corresponding wells and drilling operations must be stopped and areas must be evacuated until the levels of these toxic materials drop down to safe levels before the drilling operations may be resumed. As will be appreciated, stopping and starting of the drilling operations, including repeated stopping and starting, is very undesirable for the drilling operations as it may greatly increase the cost and the time required for the drilling operations.

Some conventional techniques for remediating $H_2S$ in fluids are discussed in, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include an amine process involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a pre-step in all liquid hydrocarbons sweetening; and since the used solvent in this process cannot be easily regenerated, caustic scrubbers are most often applied where low acid gas ($H_2S$) volumes must be treated.

$H_2S$ abatement achieved by a conventional amine treatment process uses an amine such as monoethanolamine (MEA) or triazine for treating $H_2S$ in crude oil. See, for example, U.S. Pat. No. 8,562,820 which discloses a formulation of triazine which is specially suited for treatment of hydrocarbon liquids for remediating the $H_2S$ and other sulfur containing compounds therein. However, the conventional amine treatment process may not be effective for remediating $H_2S$ in crude oil containing paraffin and other waxes and in oil containing more than 200 ppm $H_2S$. Further, the conventional triazine treatment for $H_2S$ generally requires a significant amount of triazine for treating $H_2S$, e.g., the required amount of triazine may be 10 times the amount of $H_2S$ in the contaminated liquid, and hence results in a relatively high treatment cost. Also, while the $H_2S$ may be initially remediated or abated down to acceptable levels, the sulfur contained in the treated oil may undesirably revert back to $H_2S$ over time, especially if the treated oil is heated. Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

The present inventor's previously proposed treatment compositions and methods for remediating $H_2S$, $NH_3$ and other contaminants in various contaminated fluids such as crude oil, natural gas and aqueous solutions extracted from the earth along with crude oil are disclosed in International Application Nos. PCT/US2018/050913 and PCT/US2018/064015, U.S. Pat. No. 10,913,911 and US Patent Application Publication No. 2021-0230487-A1, the entire contents of which are incorporated herein by reference. The treatment compositions and treatment methods disclosed in PCT/US2018/050913 and PCT/US2018/064015 are primarily directed at treating contaminated liquids, while the treatment compositions and treatment methods disclosed in U.S. Pat. No. 10,913,911 and US Patent Application Publication No. 2021-0230487-A1 are primarily directed at treating contaminated gasses such as natural gas. These prior proposals are very effective at quickly remediating $H_2S$ in contaminated fluids, even at very high concentrations, e.g., 100,000 ppm or more.

The prior proposals as set forth in PCT/US2018/050913 involves an aqueous treatment solution containing primarily a high concentration of one or more hydroxide compounds, wherein the hydroxide compound(s) collectively the hydroxides account for 35-55 weight percent, and preferably at least 45 weight percent of the treatment solution, which efficiently react with $H_2S$ to convert it to non-toxic substances. Essentially all hydroxide compounds may be used in the treatment composition, including such as sodium hydroxide (NaOH), potassium hydroxide (KOH), lithium hydroxide (LiOH), magnesium hydroxide ($Mg(OH)_2$), and manganese hydroxide ($Mn(OH)_2$, $Mn(OH)_4$) etc., although in terms of lower cost NaOH and KOH are preferred. Also, depending on what fluid is being remediated, what contaminants are contained in the fluid, and whether there is any concern about release of precipitates from the treated fluid, some of the hydroxide compounds may be less desirable, e.g., for treating natural gas containing salts as well as $H_2S$, NaOH would be less desirable because it adds more Na to the natural gas beyond the Na contained in the salts. Such treatment solution according to the recent proposal is highly alkaline with a pH of 14. In such treatment process a relatively small dosage of the treatment solution is added to the hydrocarbon based liquids or aqueous solutions being treated, e.g., at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. A particularly appropriate dosage rate depends on multiple factors, and the hydroxide(s) in the solution efficiently remediate the $H_2S$ and other sulfur-containing compounds down to acceptable levels within relatively short time periods such as 15 minutes to a few hours, and without otherwise detrimentally affecting the hydrocarbon-petroleum based liquids or contaminated aqueous solutions in any significant manner. The proposed treatment solution may further include one or more other components depending on the specific characteristics of the liquids being treated and other factors relating to the remediation treatment process. For example, the treatment solution may include a silicate such as potassium silicate ($K_2SiO_3$) or barium (Ba) as an antibacterial agent, but the high concentration of hydroxide(s) in the treatment solution is a primary characteristic of the solution because this is important for efficient remediation of $H_2S$ by the hydroxide(s) in the liquids being treated.

Another of the inventor's proposals as set forth in PCT/US2018/064015 involves use of the treatment liquid substantially according to the first proposal together with an appropriate amount of one or more organic acids such as fulvic acid and humic acid, which function to assure that no precipitates, scale or the like are released from the remediated liquids. A dosage rate of the organic acid(s) is one that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. A small amount of monoethanolamine or MEA ($CH_7NO$) may also be included in the treatment composition to help prevent scale formation from the remediated liquids, e.g., an amount corresponding to a concentration of 0.5-15 ppm, and preferably 1.0-10 ppm, of the MEA in the hydrocarbon based liquid or aqueous solution being treated. The organic acid(s) such as fulvic acid and humic acid are effective to bind to the remediated contaminants and maintain them in the treated liquids without forming any precipitates while they are being treated, transported and/or stored for a period of time such as hours, days or weeks, which is very important sometimes, while MEA also helps prevent scale formation from the remediated liquids.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

taminated fluids, and are much more effective and efficient than other conventionally known treatment solutions and methods known prior to the inventor's proposals, the present inventors' previously proposed compositions and methods may not be simply, directly applied for remediating contaminants including $H_2S$ and $NH_3$ encountered in environments around drilling wells for a few reasons. These include that the $H_2S$, $NH_3$ and other contaminants encountered in the ambient environments around drilling wells are primarily in gaseous form and are dispersed throughout a large volume of ambient air in the surrounding environments, which is constantly moving/changing. It is impractical to continuously remediate such gaseous contaminants once they have been released in gaseous form into the environment around a well drilling operation. Further, while the inventor's previously proposed treatment compositions may be added to

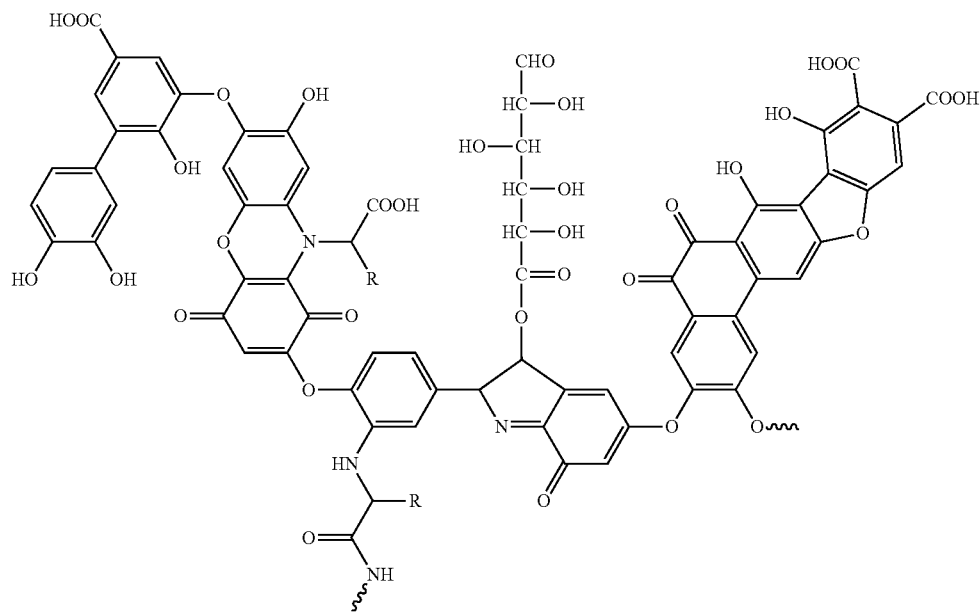

Treating $H_2S$ and other contaminants in gasses including natural gas is much more complicated and challenging that treating such contaminants in liquids such as crude oil for various reasons as discussed in U.S. Pat. No. 10,913,911 and US Patent Application Publication No. 2021-0230487-A1. The complications include being able to sufficiently contact the contaminants which are contained in the contaminated gasses with the treatment compositions which are generally aqueous based and in liquid form, and the presence of other contaminants such as water and salts in the gasses, etc. These complications make it very difficult to sufficiently remediate the contaminants in the gasses down to safe, acceptable levels in an efficient and cost effective manner. Generally, the treatment compositions previously proposed by the inventor may further include a small amount, e.g., 0.5-4 wt %, of a chelating agent such as ethylenediaminetetraacetic acid (EDTA), which among other things increases the efficiency of hydroxide compounds in remediating $H_2S$, and smaller amounts of a surfactant such as sodium lauryl sulphate and a buffering agent such as potassium carbonate or phosphoric acid ($H_3PO_4$), etc.

While the inventor's previously proposed treatment compositions and processes are very efficient and effective for remediating $H_2S$. $NH_3$ and other contaminants in the conthe crude oil, natural gas and other fluids at the time they are extracted from the well, this would not prevent the gaseous contaminants from escaping from the well while it is being drilled. Still further, due to the high fluid pressures experienced in wells, it is difficult to inject or otherwise introduce the liquid treatment compositions down into the well as it is being drilled and to get the liquid treatment compositions to contact the gaseous contaminants before the contaminants can be released from the well as it is being drilled. Hence, it still remains a challenge and need in the art for overcoming the problem of $H_2S$ and other gaseous contaminants in the environment around a well drilling platform or other well drilling operation, whether by preventing release of the gaseous contaminants from the well being drilled or otherwise remediating or eliminating the gaseous contaminants which have been released into the environment from the well drilling operation.

SUMMARY AND DISCLOSURE OF THE INVENTION

An object of the present invention is to satisfy the discussed need.

Drilling mud and Its Properties Drilling mud is an engineered material that is specifically created to have variable properties and characteristics, including density and viscosity, that are determined to be suitable for a given well drilling operation. Drilling mud is typically used by being pumped down into a drill pipe and a platform drill stem of a well throughout a well drilling operation, and as the well is drilled fragments of the earth that are being drilled become mixed with the drilling mud and the mixture is brought to the earth's surface by the nature of the drilling operation. Once at the earth's surface the mixture is processed to separate the earth fragments from the drilling mud, the mud is reconditioned to have appropriate properties for the well being drilled and again pumped down into the space between the drill pipe and the platform drill stem, and this is repeated throughout the drilling operation.

Drilling mud also provides a way of keeping the underground pressures experienced in well drilling operations in check based on its relatively large density, and generally the denser the mud, the better it can withstand the underground pressures that are experienced during the well drilling operation. The drilling mud must also have appropriate viscosity and other characteristics. If the drilling mud does not have appropriate density and/or viscosity, it may be difficult to pump, whereas the significant downhole pressures experienced in drilling a well may blow the drilling mud out of the well. Known drilling mud is created by so-called "mud engineers" to have a variety of characteristics which will vary to suit the conditions of a given well being drilled, including the particular materials that are being drilled through, to assure that the drilling mud has appropriate density and is yet able to reliably mix with and bring up to the earth's surface the earth fragments being generated by the drilling operation, cool the drill, etc. Drilling mud generally has a continuous liquid phase which is modified with various liquid and solid chemical additives to suit the performance of the mud to drilling conditions at a given well drilling operation. The known drilling mud compositions usually contains a mixture of a continuous liquid phase, clay(s), weighting material and other chemicals. Weighting materials, typically including barite, are added to the drilling mud to help it exert as much pressure as is required to contain the pressures of the formation at the well site.

There are three types of drilling mud: water-based mud (WBM), oil-based mud (OBM) and synthetic-based mud (SBM). WBMs begin with water, then clays and other chemicals are added to create a homogenous blend. Clay, or shale, is generally a mixture of native clays suspended in the mud during the drilling process. The most common of these clays is bentonite, which is often considered to be a gel. Numerous other chemicals are added to the water-based system to achieve a variety of effects, such as viscosity control, shale stability, cooling and lubricating of equipment. WBMs consist of bentonite clay with additives such as barium sulfate, calcium carbonate (chalk) and/or hematite. Thickeners, such as xanthan gum, glycol and starch, are also often used to influence viscosity. OBMs consist of a base fluid made up of a petroleum product, such as diesel fuel. OBMs are often used for increased lubricity, enhanced shale inhibition and greater cleaning abilities with less viscosity than WBMs. These fluids are composed of the petroleum product as the continuous phase, and water as a dispersed phase, along with emulsifiers, wetting agents and gellants. OBMs are capable of withstanding greater heat without breaking down compared to WBMs. SMBs, also known as low toxicity oil based mud (LTOBM), have a base fluid of synthetic oil. SMBs are most often used on offshore rigs because they have the same properties as OBMs but a toxicity of fluid fumes given off by SMBs is much lower compared to OBMs. After the drilling process is finished, the drilling waste must be disposed of in some fashion. The treatment compositions according to the present invention may be used together with all of the different types of drilling mud, but a specific example-embodiment discussed herein is an OBM type drilling mud.

The present inventor has studied possible use of the inventor's previously proposed treatment compositions and variations thereof for use in preventing, remediating or eliminating the problem of $H_2S$, $NH_3$ and other gaseous contaminants in the environment around a well drilling platform or other well drilling operation. Based on these studies, the inventor has discovered an effective and efficient solution to the problem. Particularly, according to an aspect of the present invention, the inventor has discovered that all types of the conventional chilling muds, WBM, OBM and SBM, may be modified by addition of one or more of the inventor's previously proposed treatment compositions and/or variations thereof, together with other materials conventionally used in forming the drilling muds, e.g., diatomaceous earth, clays, weighting materials and other chemicals and components suitable for achieving appropriate characteristics, including density and viscosity, suitable for a given well being drilled. Of course, given that the inventor's previously proposed treatment compositions and/or variations thereof are liquid compositions, they may affect some characteristics of the drilling mud to some extent, including viscosity, such that other components used in forming the modified drilling mud may need to be adjusted to assure that the drilling mud has appropriate properties for a given well being drilled. Such adjustments would be made by a mud engineer based on the specifics of the well, the type of drilling mud being used and the specific formulation of the treatment composition being added to the mud.

Again, the treatment compositions that may be used fir modifying the drilling mud according to the present invention include those disclosed in PCT/US2018/051903, PCT/US2018/064015, U.S. Pat. No. 10,913,911 and US Patent Application Publication No. 2021/0230487-A1, as well as variations thereof. Each of such liquid treatment compositions will primarily include water and one or more hydroxide compounds dissolved in the water at a collective concentration of 35-55 wt %, and preferably 45-55 wt %, noting that the hydroxide compounds at such wt % are very effective at quickly remediating toxic gasses, including, $H_2S$, $NH_3$, down to safe levels below 5 ppm with contact time of 0.5 to 30 seconds. The liquid treatment compositions may include other components, e.g., a chelating agent such as EDTA may be included in an amount of 0.5-4 wt % of the liquid treatment composition, an organic acid such as fulvic acid and humic acid may be included in an amount of 0.02-3 wt % of the liquid treatment composition, MEA may be included in an amount of 0.5-4 wt % of the liquid treatment composition; a relatively low molecular weight organic liquid such as an alcohol, hexane, toluene, xylene, etc. may be included in an amount of 5-30 volume % for increasing vapor pressure of the modified drilling mud, especially WBM, etc. For such liquid treatment compositions, the inventor has determined that an appropriate dosage amount of the treatment compositions which are added to the drilling mud will generally be in a range of 10-100 US gallons of the liquid treatment composition per 1000 barrels or 42,000 US gallons of drilling mud. Such dosage amount is appropriate for assuring remediation of toxic contaminants likely to be encountered in well drilling operations, including $H_2S$ and $NH_3$, down to appropriate, safe levels.

The modified drilling mud according to the present invention may then be used in essentially the same manner as conventional drilling mud, e.g., after the modified engineered mud is prepared it may be pumped down hole, e.g., between a drill pipe and a platform drill stem of the well drilling operation, at high pressure to equalize the formation pressure at the well being drilled. The conventional aspects of a well drilling operation remain essentially the same, as the well is being drilled the drilling mud mixes together with the earth fragments generated by the drilling operation and the mixture is brought to the earth's surface so that the earth fragments may be separated from the drilling mud, after which the drilling mud is reconditioned and reused in the drilling operation, and the process is repeated. However, due to the presence of the inventor's treatment compositions in the drilling mud, all or most of any gaseous contaminants including $H_2S$ and $NH_3$ which might otherwise escape from the well if it were to pass through the drilling mud into the ambient environment around the well at the surface of the earth, are remediated through their contact with the treatment compositions in the drilling mud and correspondingly do not escape into the ambient environment. Generally, there should be 0.5-30 seconds, preferably at least 1.5 seconds, of contact between the gaseous contaminants and the treatment compositions in the drilling mud to assure the contaminants are remediated into non-toxic substances. Also, each time the drilling mud is reconditioned for reuse, appropriate amounts of the treatment composition would need to be added to assure that the contaminants are properly remediated.

According to an example of the present invention, a conventional OBM was modified by addition of 25 US gallons of a liquid treatment composition as disclosed in PCT/US2018/064015, which included water, about 50 wt % collectively of KOH and NaOH, and 0.5 wt % collectively of fulvic acid and humic acid per 42,000 US gallons of the OBM. This modified drilling mud was used in an operation of drilling a well into the earth for extracting crude oil, natural gas and so-call produced water from a subterranean deposit, wherein the drilling operation had previously been stopped due to unsafe levels of more than 5 ppm of each of $H_2S$ and $NH_3$ which accumulated in the ambient atmosphere around the drilling platform. The crude oil, natural gas and produced water in the subterranean deposit, which would eventually be extracted through the well collectively contained about 60,000 ppm of $H_2S$ and about 75,000 ppm of $NH_3$. In this example, the modified OBM according to the present invention was completely successful at remediating the $H_2S$ and $NH_3$ such that the atmosphere around the drilling platform of the drilling operation contained far less than 5 ppm, essentially zero ppm, of each of $H_2S$ and $NH_3$ and the drilling operation was deemed appropriately safe to be restarted. In the two weeks immediately after the drilling operation was restarted levels of gaseous materials in the atmosphere around the drilling operation remained very low, essentially zero ppm, such that the drilling operation was been able to safely, continuously operate and to be completed over the two weeks.

Intent of Disclosure

Although the present disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Exemplary embodiments of the present invention will be described below. Primary aspects of the present invention involve preparation of a modified drilling mud, which may be WBM, OBM and/or SBM, by addition of a liquid treatment composition including water and one or more hydroxide compounds dissolved in the water at a collective concentration of 35-55 wt %, and preferably 45-55 wt %, and use of the modified drilling mud for drilling a well into the earth for extracting fluids including crude oil, natural gas and so-called produced water, such that the treatment composition can remediate any toxic gasses, including $H_2S$ and $NH_3$, that might other be released as the well is being drilled and might otherwise accumulate in the ambient atmosphere around a drilling platform of the well and create hazardous conditions for any workers on or around the drilling platform.

According to a first exemplary embodiment of the present invention, a modified drilling mud comprises: a drilling mud selected from a group consisting of water-based mud (WBM), oil-based mud (OBM) and synthetic-based mud (SBM); and a liquid treatment composition including water and collectively 35-55 weight percent of one or more hydroxide compounds, wherein a ratio of the liquid treatment composition to the drilling mud in the modified drilling mud is in a range of 10 gallons of the liquid treatment composition per 42,000 gallons of drilling mud to 100 gallons of the liquid treatment composition per 42,000 gallons of drilling mud.

The composition of the drilling mud used in the modified drilling mud, whether it is a WBM, an OBM or a SBM, can be a conventional composition which is determined by a mud engineer based on the characteristics of the given well drilling operation according to conventional practices. Components of the conventional WBM, an OBM or a SBM drilling muds may typically include clay, weighting material, an emulsifier, a wetting agent, etc. The clay may include bentonite and/or other appropriate clays, the weighting material may include barite, etc. The particular amounts of the different components will vary depending on the fluid pressures and other characteristics of the given well drilling operation that the drilling mud is to be used with because the drilling mud must have appropriate density, viscosity, weighting, etc. suitable for the given well drilling operation as discussed herein, but the amount of the liquid treatment composition will be in the discussed range.

The liquid treatment composition used in preparing the drilling mud may be one of the treatment compositions previously proposed by the inventor as set forth in PCT/US2018/050913 and PCT/US2018/06401, U.S. Pat. No. 10,913,911 and US Patent Application Publication No. 2021-0230487-A1, as well as variations thereof. However, due to the nature of drilling mud and its particular functions, the primary required aspect of the treatment composition is its ability to quickly remediate $H_2S$, $NH_3$ and other toxic gaseous contaminants that might otherwise escape from the well and rise up through or around the drill pipe, and this can be reliably achieved provided that the liquid treatment composition contains an appropriate amount of the hydroxide compound(s) suitable for quickly remediating the toxic gasses down to safe levels upon relative short contact of 0.5-30 seconds. The inventor has determined that if the liquid treatment composition is water based and contains 35-55 weight percent collectively of one or more hydroxide compounds, an appropriate amount of such treatment composition combined to be combined with the conventional drilling mud is a ratio of 10 to 100 US gallons of the liquid treatment composition per 1000 barrels, or 42,000 US gallons, of the drilling mud. The effectiveness of such the aqueous based treatment composition for quickly and efficiently remediating $H_2S$ and other contaminants in fluids is discussed in PCT/US2018/050913 and PCT/US2018/06401, U.S. Pat. No. 10,913,911 and US Patent Application Publication No. 2021-0230487-A1.

Other components that may be included in the inventor's previously proposed treatment compositions as discussed in PCT/US2018/050913 and PCT/US2018/06401, U.S. Pat. No. 10,913,911 and US Patent Application Publication No. 2021/0230487-A1, such as an anti-bacterial agent, MEA as an anti-scaling agent, organic acids such as fulvic acid and humic acid which help to prevent formation and release of precipitates, etc. may also be included in the liquid treatment composition used in forming the modified drilling mud according to the present invention. For example, the liquid treatment compositions may include: a chelating agent such as EDTA may be included in an amount of 0.5-4 wt % of the liquid treatment composition; an organic acid such as fulvic acid and humic acid may be included in an amount of 0.02-3 wt % of the liquid treatment composition, MEA may be included in an amount of 0.5-4 wt % of the liquid treatment composition; etc. Also, a relatively low molecular weight organic liquid such as an alcohol, hexane, toluene, xylene, etc. may be included in an amount of 5-30 volume % of the liquid treatment composition for increasing vapor pressure of the modified drilling mud, especially WBM which conventionally includes little or no organic liquids therein. However, the particular functions of some of these other components, e.g., preventing formation and release of precipitates and scale, anti-bacterial effect, etc., may not be that important for the drilling mud. Hence, these other components, may be omitted in the aqueous based treatment composition used in forming a drilling mud according to the present invention.

On the other hand, the liquid treatment composition used in forming a modified drilling mud according to the present invention may further include EDTA, which among other things increases the efficiency of hydroxide compound(s) in remediating $H_2S$. Thus, the treatment composition according to the present invention may include a small amount, e.g., 0.5-4 wt %, of a chelating agent such as EDTA in addition to the hydroxide compound(s).

The modified drilling mud according to the present invention may be used in essentially the same manner as conventional drilling mud, e.g., after the modified engineered mud is prepared it may be pumped down hole, e.g., between a drill pipe and a platform drill stem of the well drilling operation, at high pressure to equalize the formation pressure at the well being drilled. The conventional aspects of a well drilling operation remain essentially the same, e.g., as the well is being drilled the drilling mud mixes together with the earth fragments generated by the drilling operation and the mixture is brought to the earth's surface so that the earth fragments may be separated from the drilling mud, after which the drilling mud is reconditioned and reused in the drilling operation, and the process is repeated.

According to another embodiment of the present invention, there is provided a method for using a modified drilling mud according to the first embodiment of the invention to greatly reduce or prevent the release of $H_2S$, $NH_3$ and other toxic contaminants from subterranean fluids from a well bore during a well drilling operation, comprising the steps of:

preparing the modified drilling mud using the liquid treatment composition according to the first embodiment of the invention; and pumping appropriate amounts of the modified drilling mud down hole into a well bore being drilled in a throughout a well drilling operation such that when any gasses are released from the well bore during the drilling operation the gasses must pass through the modified drilling mud with a contact time of at least 0.5 second.

The step of pumping appropriate amounts of the modified drilling mud down hole into the well bore may involve pumping appropriate amounts of the drilling mud down hole into a space between a drill pipe and a platform drill stem of the well drilling operation as necessary throughout the well drilling operation such that the drilling mud substantially fills the space between the drill pipe and the platform drill stem.

The method for using a modified drilling mud according to the second embodiment of present invention may further involve steps of: collecting used drilling mud during the well drilling operation; reconditioning the used drilling mud to have a composition corresponding to the modified drilling mud prepared according to the first embodiment of the present invention; and pumping appropriate amounts of the reconditioned drilling mud down hole into a well bore being drilled in a throughout a well drilling operation such that when any gasses are released from the well bore during the drilling operation the gasses must pass through the reconditioned drilling mud with a contact time of at least 0.5 second.

As the novel drilling mud including a treatment composition according to the present invention is repeatedly reconditioned for reuse throughout a drilling operation it is important that the content of the liquid treatment composition in the drilling mud be maintained at an appropriate level to assure that it will be effective for remediating the $H_2S$, $NH_3$ and other toxic components of the sour gas that might otherwise be released from the well during the drilling operation. The inventor's previously proposed treatment composition used in the novel drilling mud according to the present invention will generally have a pH of 14 due to the high content of hydroxide compounds contained therein, and the drilling mud containing the treatment composition may also have a pH of about 13 to 14, so that pH is a characteristic of the novel drilling mud that may be monitored to assure that the content of the treatment composition in the drilling mud be maintained at an appropriate level.

Such method of using the modified drilling mud according to the second embodiment of the invention is very advantageous over conventional methods of using conventionally known types of drilling mud known at the time of the present invention because the liquid treatment composition included in the modified drilling mud according to the present invention is very effective at quickly remediating $H_2S$, $NH_3$ and other toxic, materials that may otherwise be released in gaseous phase from the well bore as it is being drilled. Again, 0.5 second of contact time between the toxic gasses and the modified drilling mud is sufficient to remediate the toxic gasses, but preferably contact time will be in a range of 0.5 to 30 seconds, and preferably at least 1.5 seconds.

Conversely, with the known methods involving use of conventional drilling mud, various amounts of such toxic materials may be released as vapor phase gases from a well bore as it is being drilled, and are ultimately released into the ambient atmosphere around the drilling platform above the well bore creating potential safety hazards to any workers on or around the platform, and forcing the well drilling operation to be shut down. Such toxic gases are contained in or dissolved into the fluids to be extracted from the well bore while these fluids are in liquid phase still down in the earth under great pressures, but as the fluids rise up toward the surface of the earth through the well as it is being drilled, pressures are greatly reduced and these toxic materials are released from the fluids in gaseous or vapor phase according to Henry's Law. The gaseous phase toxic materials will then migrate from the formation into the drilling cavity or well bore forming pockets of toxic gases including $H_2S$ and $NH_3$ that rise up through the conventional drilling mud and are then released into the atmosphere around the drilling platform.

According to an example of the present invention, a conventional OBM was modified by addition of 25 US gallons of a liquid treatment, composition as disclosed in PCT/US2018/064015, which included water, about 50 wt % collectively of KOH and NaOH, and 0.5 wt % collectively of fulvic acid and humic acid per 42,000 US gallons of the OBM. This modified drilling mud was used in an operation of drilling a well into the earth for extracting crude oil, natural gas and so-call produced water from a subterranean deposit, wherein the drilling operation had previously been stopped due to unsafe levels of more than 5 ppm of each of $H_2S$ and $NH_3$ which accumulated in the ambient atmosphere around the drilling platform. The crude oil, natural gas and produced water in the subterranean deposit, which would eventually be extracted through the well collectively contained about 60,000 ppm of $H_2S$ and about 75,000 ppm of $NH_3$. In this example, the modified OBM according to the present invention was completely successful at remediating the $H_2S$ and $NH_3$ such that the atmosphere around the drilling platform of the drilling operation contained far less than 5 ppm, essentially zero ppm, of each of $H_2S$ and $NH_3$ and the drilling operation was deemed appropriately safe to be restarted. In the two weeks immediately after the drilling operation was restarted levels of gaseous materials in the atmosphere around the drilling operation remained very low, essentially zero ppm, such that the drilling operation was been able to safely, continuously operate and to be completed over the two weeks.

I claim:

1. A modified drilling mud comprising: a drilling mud selected from a group consisting of oil-based mud (OBM); and a liquid treatment composition including water and collectively 35-55 weight percent of one or more hydroxide compounds, wherein a ratio of the liquid treatment composition to the drilling mud in the modified drilling mud is in a range of 10 gallons of the liquid treatment composition per 42,000 gallons of drilling mud to 100 gallons of the liquid treatment composition per 42,000 gallons of drilling mud, and
   wherein the liquid treatment composition further comprises 10-30 volume % of an organic liquid having a vapor pressure greater than the vapor pressure of water.

2. The modified drilling mud according to claim 1, wherein the liquid treatment composition further comprises 0.5-4 wt % of monoethanolamine (MEA).

3. The modified drilling mud according to claim 1, wherein the organic liquid is selected from the group consisting of alcohols, hexane, toluene, xylene.

4. The modified drilling mud according to claim 1, wherein a pH of the liquid treatment composition is 14.0.

5. A modified drilling mud comprising: a drilling mud selected from a group consisting of oil-based mud (OBM); and a liquid treatment composition including water, collectively 35-55 weight percent of one or more hydroxide compounds and 0.5-4 wt. %, of a chelating agent,
   wherein a ratio of the liquid treatment composition to the drilling mud in the modified drilling mud is in a range of 10 gallons of the liquid treatment composition per 42,000 gallons of drilling mud to 100 gallons of the liquid treatment composition per 42,000 gallons of drilling mud, and
   wherein the chelating agent is ethylenediaminetetraacetic acid (EDTA).

6. A modified drilling mud according to claim 1, comprising: a drilling mud selected from a group consisting of oil-based mud (OBM); and a liquid treatment composition including water, collectively 35-55 weight percent of one or more hydroxide compounds and 0.02-3 wt. % of an organic acid, including at least one of fulvic acid, wherein a ratio of the liquid treatment composition to the drilling mud in the modified drilling mud is in a range of 10 gallons of the liquid treatment composition per 42,000 gallons of drilling mud to 100 gallons of the liquid treatment composition per 42,000 gallons of drilling mud wherein the liquid treatment composition further comprises 0.02-3 wt. % of an organic acid, including at least one of fulvic acid.

7. A method for using drilling mud for reducing or preventing release of $H_2S$ into an ambient atmosphere surrounding a well drilling platform during a well drilling operation, comprising steps of:
   preparing a modified drilling mud using the liquid treatment composition according to claim 1; and
   pumping appropriate amounts of the modified drilling mud down hole into a well bore being drilled in a throughout a well drilling operation such that when any gasses released from the well bore during the drilling operation the gasses must pass through the modified drilling mud with a contact time of at least 0.5 second.

8. The method according to claim 7, wherein the step of pumping appropriate amounts of the modified drilling mud down hole into the well bore involves pumping appropriate amounts of the modified drilling mud down hole into a space between a drill pipe and a platform drill stem during the well drilling operation such that the drilling mud substantially fills the space between the drill pipe and the platform drill stem.

9. The method according to claim 7, comprising further steps of: collecting used drilling mud during the well drilling operation; reconditioning the used drilling mud to have a composition corresponding to the modified drilling mud prepared in the preparing step; and pumping the reconditioned drilling mud down hole into the well bore such that when any gasses are released from the well bore during the drilling operation the gasses must pass through the reconditioned drilling mud with a contact time of at least 0.5 second.

* * * * *